No. 790,909. PATENTED MAY 30, 1905.
L. E. McCANN.
FRUIT WASHER.
APPLICATION FILED FEB. 20, 1905.
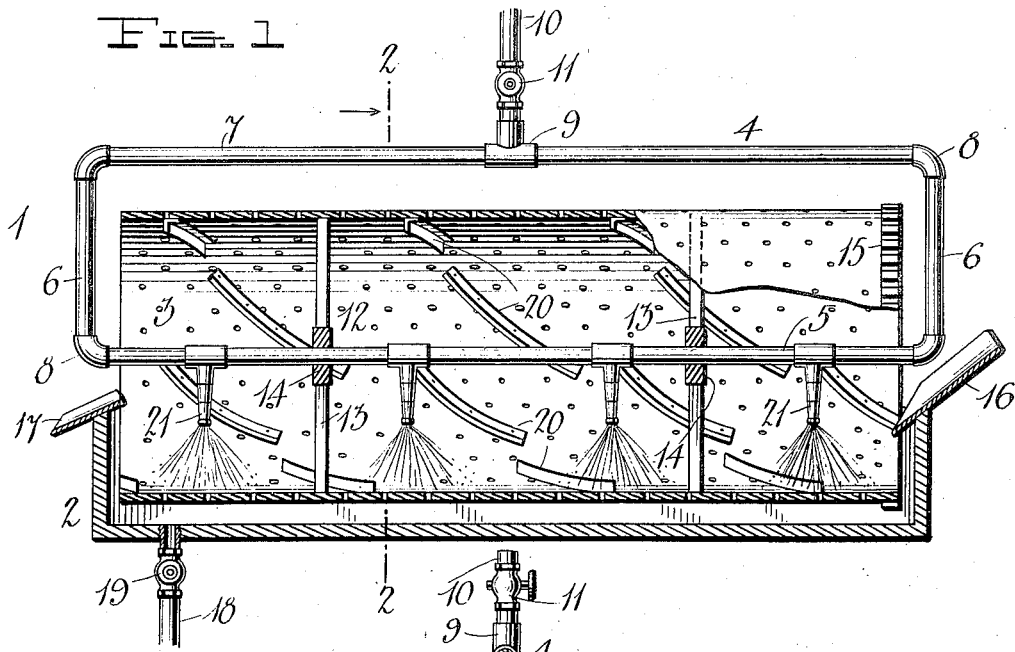
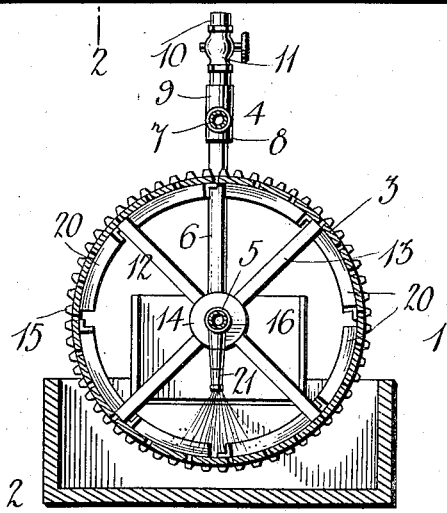
Witnesses
Inventor
Lewis E. McCann
by H. B. Wilson
Attorney No. 790,909. Patented May 30, 1905.

UNITED STATES PATENT OFFICE.

LEWIS E. McCANN, OF ONTARIO, CALIFORNIA.

FRUIT-WASHER.

SPECIFICATION forming part of Letters Patent No. 790,909, dated May 30, 1905.

Application filed February 20, 1905. Serial No. 246,540.

*To all whom it may concern:*

Be it known that I, LEWIS E. McCANN, a citizen of the United States, residing at Ontario, in the county of San Bernardino and State of California, have invented certain new and useful Improvements in Fruit-Washers; and I do declare the following to be a full, clear, and exact description of the invention, such as will enable others skilled in the art to which it appertains to make and use the same.

My invention relates to improvements in apparatus for washing peaches and other fruits after they have been treated with chemicals for the purpose of removing their skins.

The object of the invention is to provide a simple, inexpensive, durable, and highly-efficient apparatus of this character by means of which the fruit will be thoroughly washed and cleaned.

With the above and other objects in view the invention consists of certain novel features of construction, combination, and arrangement of parts, as will be hereinafter described and claimed.

In the accompanying drawings, Figure 1 is a vertical longitudinal sectional view through a fruit-washing apparatus constructed in accordance with my invention, and Fig. 2 is a vertical transverse sectional view taken on the line 2 2 in Fig. 1.

Referring to the drawings by numerals, 1 denotes my improved washing apparatus, which consists of a water-tank 2, a washing-cylinder 3, and a supporting-frame 4 for said cylinder. The frame 4 may be mounted in any desired manner above the tank 2 and is constructed of sections of pipe connected by elbow and T-shaped couplings. As shown, said frame is disposed vertically and is of rectangular form, consisting of a lower horizontal portion or pipe 5, which forms a tubular shaft upon which the cylinder 3 is mounted, vertical portions or pipes 6, and an upper horizontal portion or pipe 7. The pipes 5, 6, and 7 are connected by elbows 8, and the portion 7, which is composed of two pipe-sections, has the inner ends of said sections secured in the oppositely-projecting arms of a T-coupling 9. The other arm of said coupling 9 is connected to a water-supply pipe 10, in which is provided a controlling-valve 11.

The washing cylinder or drum 3 is disposed horizontally and has its lower portion projecting into the tank 2. The cylinder is revolubly supported and mounted by means of spiders 12, which consist of radial arms or spokes 13 and heads or hubs 14, which are mounted to rotate freely upon the tubular shaft or pipe 5 of the frame 4. The cylinder may be rotated in any desired manner; but I preferably provide upon its outer surface at one of its ends a cog-wheel or gear 15, which may be driven by a pinion, worm-wheel, or any suitable driving element upon a power-shaft.

The tank 2 is of rectangular form and has at one of its ends a fruit-inlet spout or chute 16 and at its opposite end a fruit-discharge spout 17. The spout or chute 16 is adapted to direct the fruit into the forward open end of the cylinder 3, and the spout or chute 17 conducts the fruit after it has been washed from the open rear end of the cylinder. At a suitable point in the bottom of the tank 2 is provided an outlet-pipe 18, in which is disposed a controlling-valve 19.

In order to feed the peaches or other fruit through the cylinder and at the same time thoroughly wash the same, I provide upon the inner surface of said cylinder angularly and radially disposed angle metal plates 20 and upon the tubular shaft or pipe 5 a series of spray-nozzles 21. The agitating plates or devices 20 are spaced apart, as shown in Fig. 1, so that as the cylinder is rotated the fruit will be rolled from one to the other of said plates or devices, and thus moved through the cylinder. The discharge-nozzles 21 are so disposed that they will spray the fruit as it falls from one plate or device 20 to the next, and in this way the fruit is agitated or turned so that every portion of it is exposed to the spray from said nozzles.

The construction, operation, and advantages of the apparatus will be understood from the foregoing description, taken in connection with the accompanying drawings. After the fruit has been treated with chemicals which remove their skins they are discharged upon the chute 16, which directs them into the cylinder 3, where they are subjected to a strong jet or spray of cold water or other cleaning liquid which is discharged from the nozzles 21. The angular or radial disposition of the plates or devices 20 feed the fruit rearwardly and at the same time turn or roll the same, so that it will be thoroughly washed and cleaned.

Various changes in the form, proportion, and the minor details of construction may be resorted to without departing from the principle or sacrificing any of the advantages of this invention.

Having thus described my invention, what I claim as new, and desire to secure by Letters Patent, is—

1. An apparatus of the character described, comprising a tank, a tubular stationary shaft mounted above said tank, a washing-cylinder mounted to rotate upon said shaft, angularly-disposed agitating devices upon the inner surface of said cylinder, spray-nozzles upon said shaft within said cylinder, and means for supplying liquid to said tubular shaft, substantially as described.

2. An apparatus of the class described, comprising a tank, a rectangular frame mounted above said tank and composed of pipe-sections, a revoluble washing-cylinder mounted to permit the periphery thereof to revolve through the frame, angularly-disposed agitating devices on the inner surface of said cylinder, spray-nozzles upon said frame within said cylinder, and a valve-controlled liquid-supply pipe for said frame, substantially as described.

3. An apparatus of the character described, comprising a tank, a valve-controlled outlet-pipe therefor, inlet and discharge chutes at the ends of said tank, a vertically-disposed rectangular supporting-frame mounted above said tank and composed of pipe-sections, a valve-controlled supply-pipe connected to the upper portion of said frame, spray-nozzles upon the lower portion of said frame, spiders mounted to rotate upon the lower portion of said frame, a washing-cylinder carried by said spiders, angularly-disposed angle metal plates upon the inner surface of said cylinder, and means for rotating said cylinder, substantially as described.

In testimony whereof I have hereunto set my hand in presence of two subscribing witnesses.

LEWIS E. McCANN.

Witnesses:
J. R. POLLOCK,
J. H. FRIEND.